United States Patent
Singh et al.

(10) Patent No.: US 10,260,896 B2
(45) Date of Patent: Apr. 16, 2019

(54) ROUTE PLANNING DEVICE AND ASSOCIATED METHOD

(71) Applicant: JAGUAR LAND ROVER LIMITED, Whitley, Coventry, Warwickshire (GB)

(72) Inventors: Harpreet Singh, Coventry (GB); Lee Skrypchuk, Meriden (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 15/505,184

(22) PCT Filed: Aug. 18, 2015

(86) PCT No.: PCT/EP2015/068961
§ 371 (c)(1),
(2) Date: Feb. 20, 2017

(87) PCT Pub. No.: WO2016/026865
PCT Pub. Date: Feb. 25, 2016

(65) Prior Publication Data
US 2017/0268892 A1    Sep. 21, 2017

(30) Foreign Application Priority Data
Aug. 20, 2014 (GB) .................................. 1414778.9

(51) Int. Cl.
*G01C 21/34* (2006.01)
*G01C 21/36* (2006.01)

(52) U.S. Cl.
CPC ..... *G01C 21/3423* (2013.01); *G01C 21/3484* (2013.01); *G01C 21/3626* (2013.01)

(58) Field of Classification Search
CPC .................................................. G01C 21/3423
See application file for complete search history.

(56) References Cited

U.S. PATENT DOCUMENTS

| | | | |
|---|---|---|---|
| 7,474,960 B1 * | 1/2009 | Nesbitt | G01C 21/367 340/995.1 |
| 8,014,908 B2 * | 9/2011 | Clarke | G06Q 10/0631 340/990 |

(Continued)

FOREIGN PATENT DOCUMENTS

| | | |
|---|---|---|
| EP | 1030167 A1 | 8/2000 |
| EP | 2799816 A1 | 11/2014 |
| WO | WO0237446 A1 | 5/2002 |

OTHER PUBLICATIONS

Combined Search and Examination Report for application No. GB1414778.9, dated Feb. 19, 2015, 9 pages.

(Continued)

*Primary Examiner* — Alex C Dunn
(74) *Attorney, Agent, or Firm* — Reising Ethington P.C.

(57) ABSTRACT

A vehicle having a route planning device that includes a processor configured to identify a start location for a journey and a destination for the journey. One or more modes of transport for completing at least a portion of the journey are identified. The processor generates a travel route from the start location to the destination. The generated route includes a plurality of modes of transport. At least one of the one or more identified modes of transport is selected in dependence on one or more preferences associated with the user. Also provided is a method of planning a travel route.

15 Claims, 11 Drawing Sheets

(56) References Cited

U.S. PATENT DOCUMENTS

| | | | | |
|---|---|---|---|---|
| 8,538,677 B2* | 9/2013 | Gutman | G01C 21/3469 701/400 |
| 8,612,140 B2* | 12/2013 | Gutman | G01C 21/3469 701/410 |
| 8,938,348 B2* | 1/2015 | Nikovski | B61L 27/0027 701/400 |
| 8,972,169 B2* | 3/2015 | Gutman | G01C 21/3469 701/410 |
| 2005/0021227 A1* | 1/2005 | Matsumoto | G01C 21/3415 701/431 |
| 2007/0239348 A1 | 10/2007 | Cheung | |
| 2008/0059061 A1 | 3/2008 | Lee | |
| 2009/0119001 A1* | 5/2009 | Moussaeiff | G01C 21/005 701/532 |
| 2010/0049397 A1* | 2/2010 | Liu | G01C 21/3469 701/31.4 |
| 2010/0268447 A1 | 10/2010 | Griffiths | |
| 2011/0208417 A1* | 8/2011 | Fink | G01C 21/3676 701/532 |
| 2011/0288765 A1* | 11/2011 | Conway | G01C 21/3469 701/533 |
| 2012/0010809 A1 | 1/2012 | Stut et al. | |
| 2012/0209522 A1* | 8/2012 | Gollnick | G01C 21/3423 701/527 |
| 2013/0046456 A1 | 2/2013 | Scofield et al. | |
| 2013/0261956 A1 | 10/2013 | Marks | |
| 2013/0262222 A1 | 10/2013 | Gibson et al. | |
| 2014/0012498 A1 | 1/2014 | Gustafson et al. | |
| 2014/0052374 A1* | 2/2014 | Hoch | G01C 21/343 701/533 |
| 2014/0266805 A1* | 9/2014 | Tippelhofer | G08G 1/143 340/932.2 |
| 2015/0123818 A1* | 5/2015 | Sellschopp | G01C 21/3484 340/932.2 |

OTHER PUBLICATIONS

International Search Report for International application No. PCT/EP2015/068961, dated Nov. 25, 2015, 9 pages.

Written Opinion for International application No. PCT/EP2015/068961, dated Nov. 25, 2015, 7 pages.

Combined Search and Examination Report for application No. GB1514661.6, dated Jan. 29, 2016, 10 pages.

British Examination Report for application No. GB1514661.6, dated Sep. 5, 2017, 4 pages.

* cited by examiner

Flowchart Key - (A to O)

| | |
|---|---|
| A | Driver starts journey / enters destination address in the navigation system |
| B | System analysis user profile |
| C | System historic data analysis to understand user preferences |
| D | Does user prefer public transport linking for this type of journey in the past |
| E | Start public transport analysis and incorporation into destination route planning |
| F | Default preference profile is used |
| G | Display various transport options to the driver |
| H | User selects an option and system updates the navigation system accordingly. |
| I | A issue near destination address identified |
| J | The system update user with information and ask if user wants to look for alternative method of reach destination. |
| K | User response |
| L | System analysis situation to recommend potential benefits of recommended option |
| M | User response |
| N | Record user response for future analysis |
| O | System goes to ideal state till user request for information and/or there is change in situation around destination |

FIG. 2B

Flowchart Key - (A' to M')

| | |
|---|---|
| A' | Identify type of journey e.g. daily commute, journey to unfamiliar destination etc. |
| B' | Analysis of driving conditions to the destination |
| C' | Analysis of historic user preferences/behaviour data to predict user preferences |
| D' | Create user behaviour and preference table and priority matrix (/weightage matrix) |
| F' | The system collects information about all option for such as (but not limited to)<br>1. All public transport (Bus, Tramp, Metro, Tube, Train) options to the destination.<br>1a. Timing<br>1b. Cost<br>1c. Historic traffic condition data around public transport stop to estimate traffic on arrival<br>2. Alternative parking location Including<br>2a. Parking cost,<br>2b. Car park timing,<br>2c. Number of spaces available presently,<br>2d. Present traffic condition<br>2e, Historic data about traffic condition at expected time of arrival to predict traffic condition on arrival. |
| G' | Identify possible connection to the destination |
| H' | Analysis of user preferences |
| I' | Identify public transport stop nearby destination as per user preferences |
| J' | Collect all data (including service time, cost, frequency etc,) about identified suitable transport |
| K' | Identify possible car park location to the destination |
| L' | Analysis of journey options and corresponding car parking options against the user preferences. |
| M' | System display options to the user with details of saving on cost, time, carbon etc, in order of user preference with recommended option |

FIG. 3B

ROUTE PLANNING DEVICE AND ASSOCIATED METHOD

TECHNICAL FIELD

The present disclosure relates to a route planning device and method. Aspects of the invention relate to a vehicle having a route planning device; to a method of generating a travel route; and to a route planning device.

BACKGROUND

It is known to provide a satellite navigation system for a vehicle. The system can generate a travel route to a user-defined destination and instructions are then output to facilitate navigation to the destination. However, the satellite navigation system typically generates the route only taking into account travel within the vehicle. This may not be the most appropriate mode of transport to reach a particular destination.

At least in certain embodiments, the present invention seeks to provide a route planning device which overcomes or ameliorates at least some of the problems associated with known devices.

SUMMARY OF THE INVENTION

Aspects of the present invention relate to a vehicle; to a method of generating a travel route; and to a route planning device.

According to a further aspect of the present invention there is provided a vehicle comprising a route planning device, the route planning device comprising a processor configured to:

identify a start location for a journey;
identify a destination for the journey; and
generate a travel route from the start location to the destination;

wherein generating the travel route comprises comparing a plurality of modes of transport and selecting at least one of said plurality of modes of transport in dependence on one or more preferences associated with a vehicle user.

The processor typically identifies a plurality of modes of transport suitable for completing at least a portion of the journey. At least in certain scenarios, the travel route can comprise a plurality of the identified modes of transport. The resulting intermodal travel route can integrate travel in said vehicle with travel making use of public transport, for example. By implementing user preferences, the route planning device can generate a customized route to the defined destination. The travel route can link public transport to vehicle usage to generate the most time-efficient route to the defined destination. The route planning device can also look at the current user state, for example by referencing the user's diary or calendar to determine the purpose of the journey. A holistic journey approach to planning a whole journey, including a return journey can be considered.

The route planning device can learn the user preferences, for example based on historical data.

The start location and/or the destination for the journey can be user-defined. Alternatively, the start location could correspond to a current vehicle location. The current vehicle location could, for example, be determined with reference to a satellite navigation system. The destination could be obtained automatically from a database associated with the user (for example a diary, calendar, e-mail database, or a short messaging service communication).

The route planning strategy can be modified based on events determined at the defined destination, for example based on traffic congestion at the defined destination. If appropriate, the device can propose alternate routes to the defined destination.

The user can request that the device identify a route from a starting location (A) to a destination (B) at a particular time, where the starting location (A) can be the same or different than the present location of the vehicle and destination (B) can be any location. If the user doesn't specify the starting location (A), the device can be configured to use the current vehicle location. If the user doesn't specify the destination (B), the device will use the current destination. If the user doesn't specify a time, the device will use the current time.

The route planning device can make use of cellular communication networks to retrieve one or more of the following: public transport timetable information (for example to determine departure and/or arrival times); reported delays in the scheduled public transport services; transportation fares; parking space availability; and parking charges. The route planning device can estimate a total travel time based on a plurality of candidate travel routes.

The route planning device could access personal data, for example by accessing user calendar information. Alternatively, the route planning device could ask for more information, for example to determine when the return journey will take place. The route planning device can also look at transport options for a return journey starting from the destination. For example, the route planning device could obtain timetable information for public transport to complete the return journey. The generated route from the start location to the destination could be modified based on the information determined for the return journey. For example, the route planning device could generate the route to avoid a route which relies on public transport for the return journey after the last scheduled service.

The device could be configured to continue to assess multimodal travel options while the user is away from the vehicle and update the user with options, for example for the return journey in view of changing conditions. An update could, for example, be pushed or forwarded to a cellular telephone associated with the user. A dedicated software application could operate on the user's cellular telephone. There may be a handshake between the dedicated software application and the vehicle and/or device. The vehicle and/or the device may communicate with the dedicated software application to send relevant information. The vehicle and/or device may communicate a route or a subsequent part of journey to a user outside the vehicle. The relevant route information may be communicated by a notification such as text, email etc. Relevant route information may be transmitted to and from the dedicated software application on a mobile device. Alternatively relevant route information may be transmitted from a remote server.

At least some of said preferences can be pre-defined by said user. Alternatively, or in addition, at least some of said preferences can be determined based on historical data and/or current data. The current data can be data which is updated at least substantially in real time. The processor can be configured to predict said preference based on said historical data and/or said current data. The current data can be obtained by accessing a remote server over a wireless network, such as a cellular telephone network or a dedicated data network. The current data can be updated at least substantially in real time.

A rating or ranking can be applied to each subset of the data and the preference predicted using an algorithm. The algorithm can, for example, implement probability analysis to determine the most likely user preferences.

The one or more preferences can comprise one or more of the following:
  a distance that the user prefers to walk;
  a preferred mode of personal transport;
  a preferred mode of public transport;
  a scheduled appointment time;
  an estimated time to destination;
  an estimated return time; and
  a scheduled connection.

The one or more preferences can comprise one or more parameters relating to a return journey from said destination to the current location of the vehicle or to a user-defined location.

The generated route can comprise a first mode of transport and a second mode of transport. The first and second modes of transport can be different from each other. The processor can be configured to identify an intermediate location for the user to change from said first mode of transport to said second mode of transport. The vehicle can represent either said first mode of transport or said second mode of transport. The first mode of transport can consist of driving in said vehicle; and the second mode of transport can consist of public transport.

The processor can be configured to identify said intermediate location from one or more candidate locations. The intermediate location can be identified in dependence on said one or more preferences associated with said user. Alternatively, or in addition, the intermediate locations can be based on real time information relating to each said candidate location. For example, an intermediate location can be identified based on weather conditions at each candidate location and/or traffic information at or on the route to said candidate location.

The processor can be configured to identify at least one car park on said generated route. The vehicle can represent either said first mode of transport or said second mode of transport. The processor can be configured to identify at least one car park proximal to said intermediate location for parking the vehicle.

The processor can be configured to determine one or more of the following parameters relating to each said car park:
  availability of parking spaces for said vehicle;
  a financial cost of parking the vehicle;
  opening hours of said car park.

The processor can be configured to select one of a plurality of said car parks in dependence on said one or more preferences associated with said user. The car park can, for example, be a park-and-ride service.

The current vehicle location can be specified by the user or can be determined by communication with a satellite network.

The vehicle is typically a road-going vehicle, such as an automobile or a sports utility vehicle.

The vehicle can comprise a battery for supplying electric current to a traction motor.

The travel route could comprise a charging station for re-charging the battery.

According to a further aspect of the present invention there is provided a method of generating a travel route, the method comprising:
  identifying a start location for a journey;
  identifying a destination for the journey; and
  generating a travel route from the start location to the destination;
  wherein generating the travel route comprises comparing a plurality of modes of transport and selecting at least one of said plurality of modes of transport in dependence on one or more preferences associated with a user.

The start location can correspond to the current location of the vehicle. The destination can be user-defined or can be obtained by interrogating a database associated with the user.

According to a further aspect of the present invention there is provided a route planning device comprising a processor configured to:
  identify a start location for a journey;
  identify a destination for the journey; and
  generate a travel route from the start location to the destination;
  wherein generating the travel route comprises comparing a plurality of modes of transport and selecting at least one of said plurality of modes of transport in dependence on one or more preferences associated with a user.

The route planning device can comprise system memory including computer program code, wherein the system memory and the computer program code are configured, with the processor, to cause the test apparatus to implement the method(s) described herein.

The processor described herein is apparatus and can comprise one or more electronic processors. Similarly, the system memory can comprise one or more memory devices coupled to the processor. The processor can be a general purpose processor which is caused to implement the method (s) described herein when computer program code is executed.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which:

FIGS. 2A and 2B together comprise FIG. 2 which shows a procedural flow chart for the operation of the route planning device shown in FIG. 1;

FIGS. 3A and 3B together comprise FIG. 3 which shows a first sub-routine of the flow chart shown in FIG. 2;

DETAILED DESCRIPTION

Figure 1:
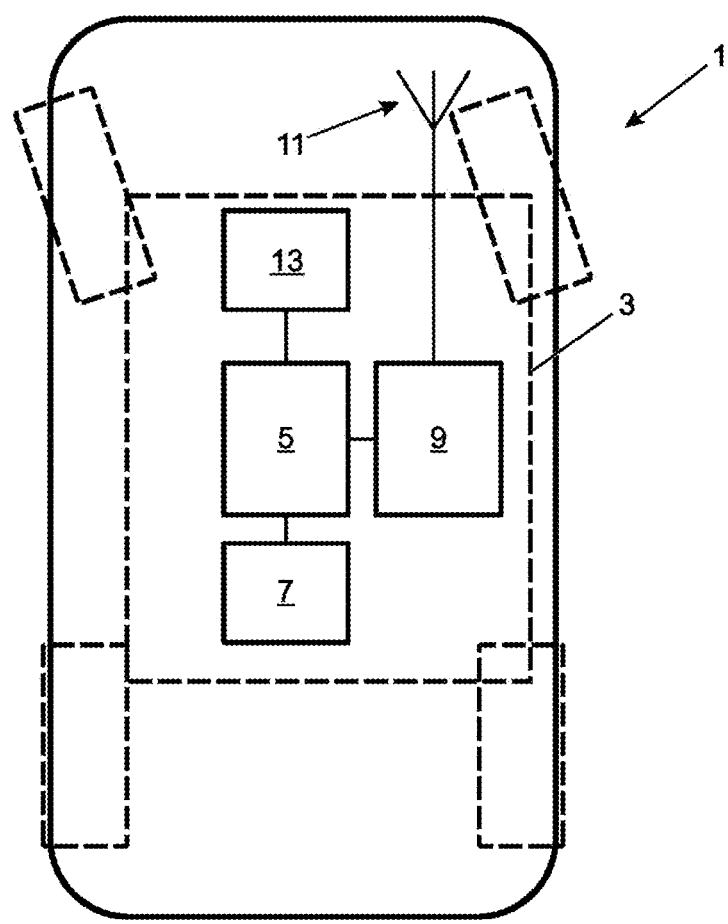
FIG. 1 shows a schematic representation of a vehicle incorporating a route planning device in accordance with an embodiment of the present invention.
Figure 2A:
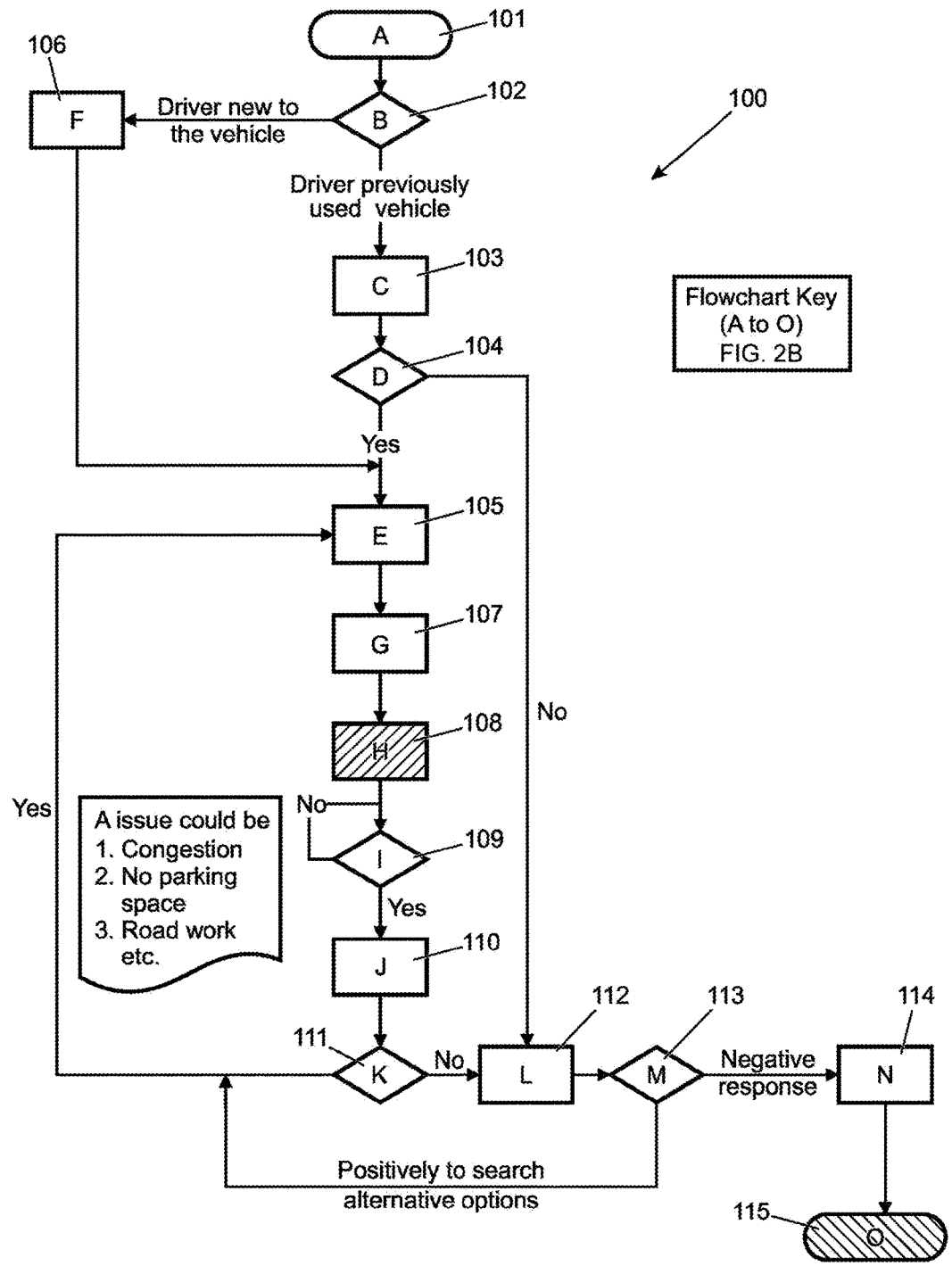
Figure 3A:
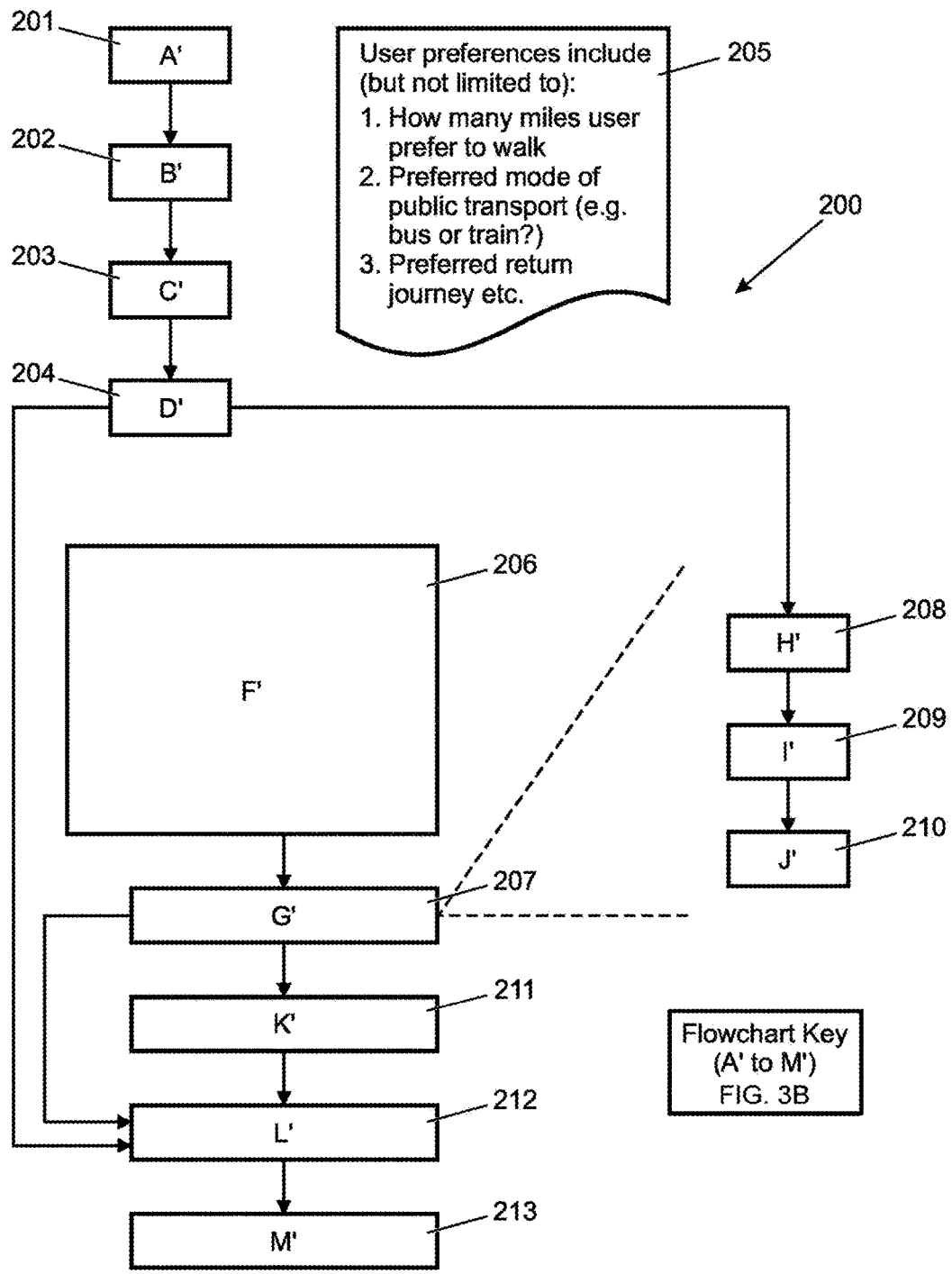

A vehicle 1 incorporating an intermodal route planning device 3 in accordance with an embodiment of the present invention is shown in FIG. 1. The device 3 is configured to integrate vehicle and public transport transportation. The route planning device 3 in the present embodiment is installed in the vehicle 1, for example in the dashboard or centre console (not shown)

The route planning device 3 comprises a control unit 5 comprising one or more electronic processors (not shown) operatively connected to a storage device 7, such as memory. The control unit 5 is operatively connected to a satellite navigation device 9 having an antenna 11 for receiving radio signals transmitted from a network of earth-orbiting satellites. The satellite navigation device 9 operates in conventional manner to determine the geographic location of the vehicle 1. The position of the vehicle 1 identified by the satellite navigation device 9 is referred to herein as the current vehicle location. Rather than utilize the current vehicle location, the user could specify an alternate start location for a journey which is then used as a start point for subsequent route planning.

The route planning device 3 is coupled to a human machine interface (HMI) 13 to enable a user to input data. The user can use the HMI 13 to enter a destination into the route planning device 3, for example using an address, a post (ZIP) code, or coordinates. The HMI 13 can, for example, comprise an input wheel, a touch screen, a keypad or a steering wheel control. Rather than rely on a user-specified destination, the route planning device 3 could retrieve a destination from the user's diary (or other database associated with the user). Equally, the route planning device 3 could suggest possible destinations based on historical data. The route planning device 3 could, for example, display one or more candidate destinations and allow the user to select the destination for a particular journey. Alternatively, or in addition, preferred start locations and/or destinations could be stored for selection by the user.

The device 3 is configured to generate a route from the current vehicle location to the destination specified by the user. In accordance with the present invention, the device 3 is configured to generate the route taking account of a plurality of different modes of transport. The vehicle 1 represents only one mode of transport to be considered when the device 3 generates the route. The device 3 can also take into account one or more forms of public transport; and/or the user walking as a further mode of transport. The device 3 can thereby generate a route comprising a plurality of different modes of transport. If the route comprises performing a first section in the vehicle 1 and a second section on public transport, the device 3 can be configured to identify a suitable break point in the journey and to identify a car park for parking the vehicle 1.

As described herein, the route is generated with reference to preferences associated with the user (typically the driver of the vehicle 1). The preferences for each user are defined in user profiles which are stored in the storage device 7. The user can select the appropriate profile when they enter the vehicle, for example by selecting their name from a list of stored profiles. Alternatively, automatic user identification can be performed, for example employing one or more of the following techniques: image recognition, biometric method, specific user action/gesture, user device detection (cellular telephone, key fob etc.)

The device 3 then generates routes based on the preferences associated with that user. The operation of the device 3 will now be described with reference to the process flow charts in FIGS. 2 to 5.

The process commences when the user starts a journey, and enters a destination into the route planning device 3 (STEP 101). The device 3 carries out an analysis of the user's profile, and determines whether or not the user is new to the vehicle (STEP 102). If the user has previously used the vehicle, the device 3 carries out an analysis of the user's historic data to understand the user's preferences (STEP 103). A first sub-routine 200 for analyzing the historic data is described in more detail below with reference to FIG. 3.

The device 3 then determines whether or not the user has a preference to use public transport for the type of journey being considered (STEP 104). If the user has previously had such a preference, the process commences an analysis of available public transport options and incorporates this information into the destination route planning (STEP 105). The user preferences can be pre-defined by the user, for example based on criteria input by the user. Alternatively, the user preferences can be derived from historical data. The historical data can, for example, be data recorded for a similar journey completed previously by the user (for example a journey having the same destination); or cumulative data recorded over a plurality of journeys completed previously by the user.

If the device 3 determines that the user is new to the vehicle (STEP 102), a default preference profile is selected for use during the remainder of the procedure (STEP 106). The process then performs an analysis of available public transport options and incorporates them into the destination route planning (STEP 105). The analysis of the public transport is performed as part of the first sub-routine 200 shown in FIG. 3. The device 3 can learn about the preferences of a new user as they use the vehicle and make decisions. A learning algorithm can implement this strategy in combination with predefined user settings.

Following the analysis of the public transport, the device 3 displays the various transport options to the user (STEP 107). These options include details of savings on cost, time, carbon emissions etc. in order of user preference, and with a recommended option. The transport options can, for example, be output to the display provided in the central console of the vehicle.

The user then selects one of the displayed transport options (STEP 108), and the device 3 is updated accordingly. The device 3 monitors conditions at the defined destination and determines whether or not there is an issue near the destination address, such as congestion, no parking space available, road works etc. (STEP 109). Identification of an issue can be performed automatically by accessing one or more databases, stored locally and/or remotely. The device 3 can communicate with a remote server over a wireless network (such as a cellular telephone network) to obtain current data (i.e. data which is updated substantially in real time), for example to identify localized congestion and/or to check availability of parking spaces in one or more car parks along the route. If the device 3 identifies a potential issue at the destination address (which may, for example, result in an unexpected delay), an update is output to the user (STEP 110) to provide the relevant information. The user is asked whether they want to look for alternative options for reaching the destination. The user enters a response (STEP 111). If an alternative is required, the process repeats analysis of the public transport options (STEP 105), and the intervening procedures (STEPS 107-110) are repeated.

If the user does not require an alternative option, the device 3 analyses the situation to recommend the potential benefits of alternate options (STEP 112). For example, a time or cost saving associated with a particular route can be output for the user. If the user indicates a preference against using public transport for the type of journey being considered (STEP 104), the process moves directly to recommend alternate options (STEP 112).

The user responds then inputs a response (STEP 113) to the recommendations made by the device 3. If the response is positive and the user confirms that they would like the device 3 to search for alternative options, the process returns to procedural step to analyze public transport options (STEP 105), and the intervening procedures (STEPS 107 to 112) are repeated. If the user response is that no further search for alternative options is required, the device 3 records the user's response for future analysis (STEP 114). The device 3 then goes into an idle state (STEP 115) until the user makes a request for information and/or there is a change in the situation around the destination.

As outlined above, the first sub-routine 200 is implemented to analyze the user's historic data to understand the user preferences (STEP 103). The first sub-routine 200 will now be described with reference to FIG. 3. The type of the journey to be made is identified (STEP 201). For example, the device 3 can identify a frequent destination, such as a daily commute; an infrequent destination, such as a trip to an airport; or a journey to an unfamiliar destination. The device 3 then analyses the driving conditions to the destination (STEP 202). The device 3 analyses the historic preferences/behavior data of the user so as to predict user preferences (STEP 203). A user behavior and preference table T1 and a priority matrix (i.e. a weightage matrix) are created (STEP 204). The priority matrix can define a rating for each of the defined preferences. A sample preference table T1 showing the journey selection criteria (User preference situational matrix (UPSiM) and the Journey user preference matrix) is reproduced below.

TABLE T1

| Journey selection Criteria: Driving conditions (User preference situational matrix (UPSiM)) | |
|---|---|
| Weather condition | 1. Weather |
| Walking | 2. How much I have to walk? |
| Time taken | 3. Time to destination |
| | Total Time (car to parking, An = walking to transport + n, walking to destination) |
| | where A can be multiple transports and n is walking to new transport |
| Total return journey Cost | 4. Cost |
| | + Cost saving over period of time |
| | Cost saving calculation over period of time (if I do this on daily basis, and if I have for example a rail card that gives me discounts, what would be the best option). Maybe for day it is best to use taxi but for a month a train? |
| Will do First table analysis | 5. Convenience of parking |
| | Number of parking spaces available near station |
| Return journey time | 6. Return Journey convenience? |
| Public transport preference | 7. What type of transport? (I would prefer Train than a bus) |
| Facilities available | 8. Facilities available |
| | Seat Reservation and Facility (coffee or WiFi - can I do work whilst travelling?) |
| Arrival time vs User diary | 9. Arrival time - If I need to be at destination at 12pm what would be the best travel route at cheapest price |
| Number of changes | Number of inter-changes |
| Journey selection Criteria: Driving conditions (Journey user preference matrix) | |
| Cost | 1. Cost |
| Parking facility | 2. Number of parking spaces available |
| Predicted Traffic conditions | 4. Predicted Traffic condition outside car park during return journey? |
| Security | 5. Car security (Crime rate) |
| Proximity to destination | 6. Proximity of car park to destination |
| Time to destination | 7. Time to destination after you parked, i.e. Total Time (car parking + walking/cycling/bus) |
| Parking facility | 8. Parking payment options (card or cash, or cash only; Receipts?) |
| Opening time | 9. Opening Times (maybe parking shuts at 10pm - and you won't be able to leave until tomorrow) |

The user preference table T1 illustrates the user preferences which include, but are not limited to, one or more of the following: how far the user is prepared to walk, the preferred mode of public transport (e.g. bus or train), and the preferred return journey). When creating the user behavior and preference table T1, an analysis of user preferences is made, as well as identifying a public transport stop near to the destination as per user preferences. Data is also collected (including service, time, cost, frequency etc.) about identified suitable public transport.

As outlined above, the device 3 collects information about the available public transport options to reach the specified destination (STEP 105). The collection of data is performed as part of the first sub-routine 200 and, as described herein, the collected data is combined with the data stored in the user behavior and preference table T1. The device 3 collects information for different modes of public transport suitable for conveying the user from the current location (or an alternate location specified by the user) to the specified destination; or from an intermediate location to the specified address (STEP 206). The public transport options can include car sharing, bus, rail, underground (subway) and tram transportation from the current location to the specified destination; or from an intermediate location to the specified destination.

The information collected in relation to public transport can include one or more of the following: timing (for example departure time, arrival time and/or journey time); cost (for example a fare for completing the journey); and historic traffic condition data in the region of the public transport station (or stop) to estimate local traffic on arrival. The analysis can optionally also look at alternative parking locations, including one or more of the following: parking cost; car park opening hours; available parking spaces (which may be updated in real time); present traffic conditions (for example, real time traffic data); and historic data at the expected time of arrival at the station to predict traffic conditions on arrival.

The device 3 identifies possible travel connections to the destination (STEP 207). The travel connections are identified with reference to the user behavior and preference table T1. In particular, the user behavior and preference table T1 is analyzed to identify user preferences (STEP 208). The device 3 identifies the public transport stations (or stops) proximal to the specified destination are identified based on the user preferences (STEP 209). A second sub-routine 300 is implemented to identify the public transport stations and this is described below with reference to FIG. 4. The data (including service times, cost, frequency etc.) relating to the identified public transport routes for performing part or all of the journey to the specified destination is collected (STEP 210). The collected data is returned to identify the possible connections to the destination (STEP 207).

The device 3 identifies possible car park locations for the destination (STEP 211). A third sub-routine 400 is implemented to identify the possible car park locations (for example to identify car parks within a predefined range of a public transport route connection) and this is described below with reference to FIG. 4. The journey options and corresponding parking options are analyzed (STEP 212) with reference to the user behavior and preference table T1. The device 3 displays the options to the user (STEP 213) with details of savings on cost, time, emissions (for example estimated CO2 emissions). The options are displayed in an order based on the defined user preferences, optionally with a recommended option highlighted. The identified options are then displayed (STEP 107), for example on a screen associated with the HMI 13.

Figure 4:
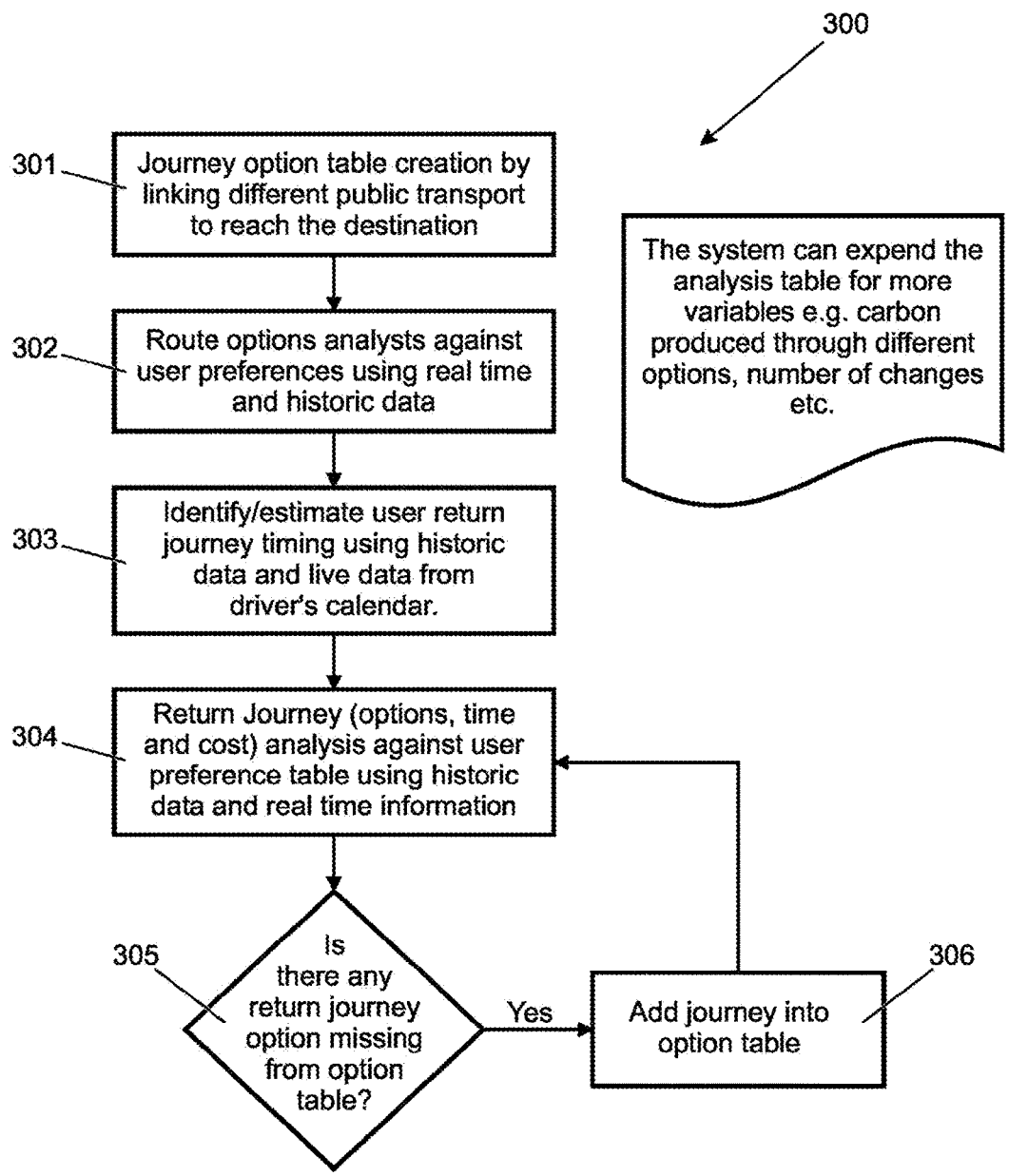
FIG. 4 shows a second sub-routine of the flow chart shown in FIG. 2.
Figure 5:
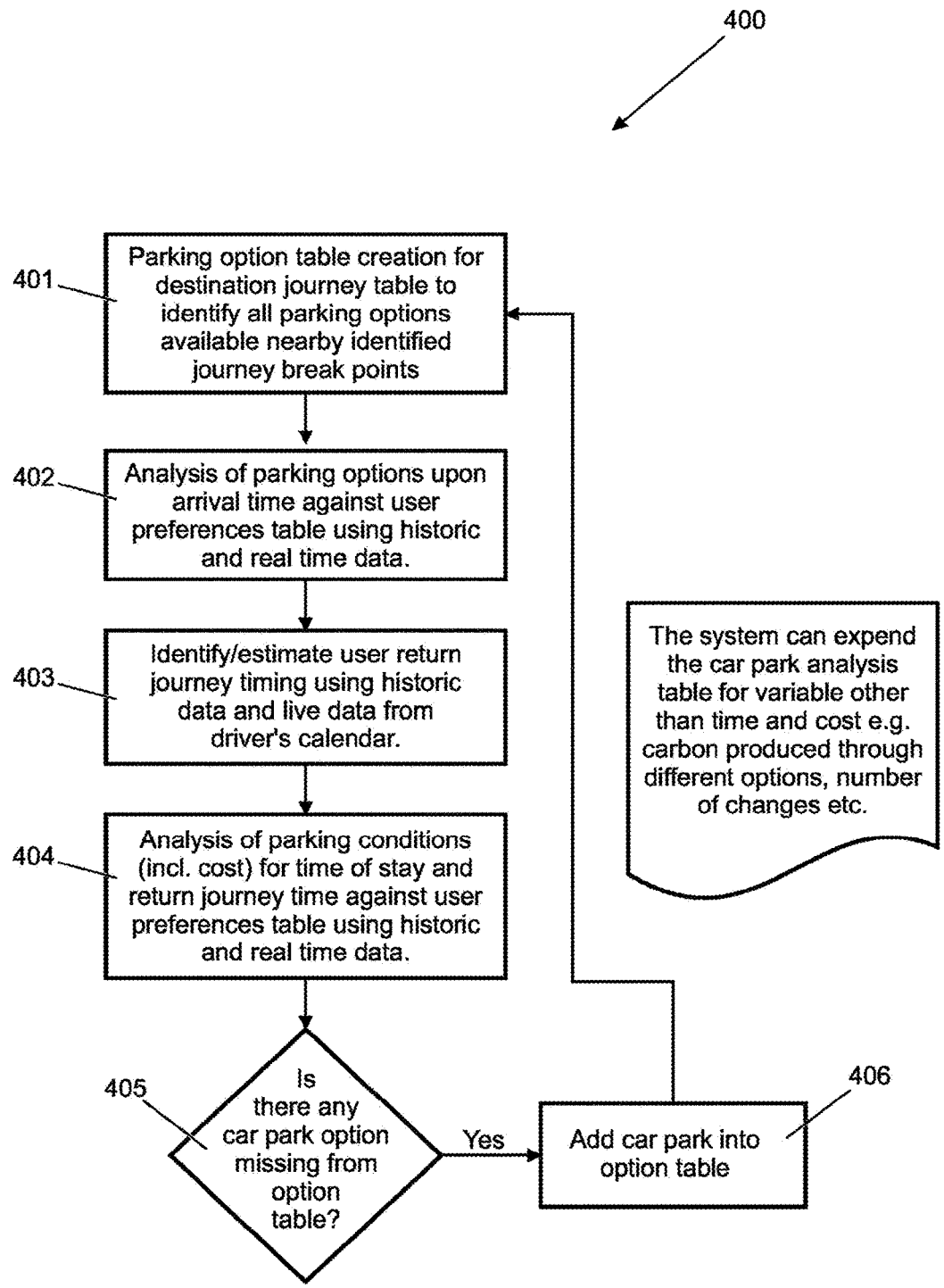
FIG. 5 shows a third sub-routine of the flow chart shown in FIG. 2.
Figure 6A:
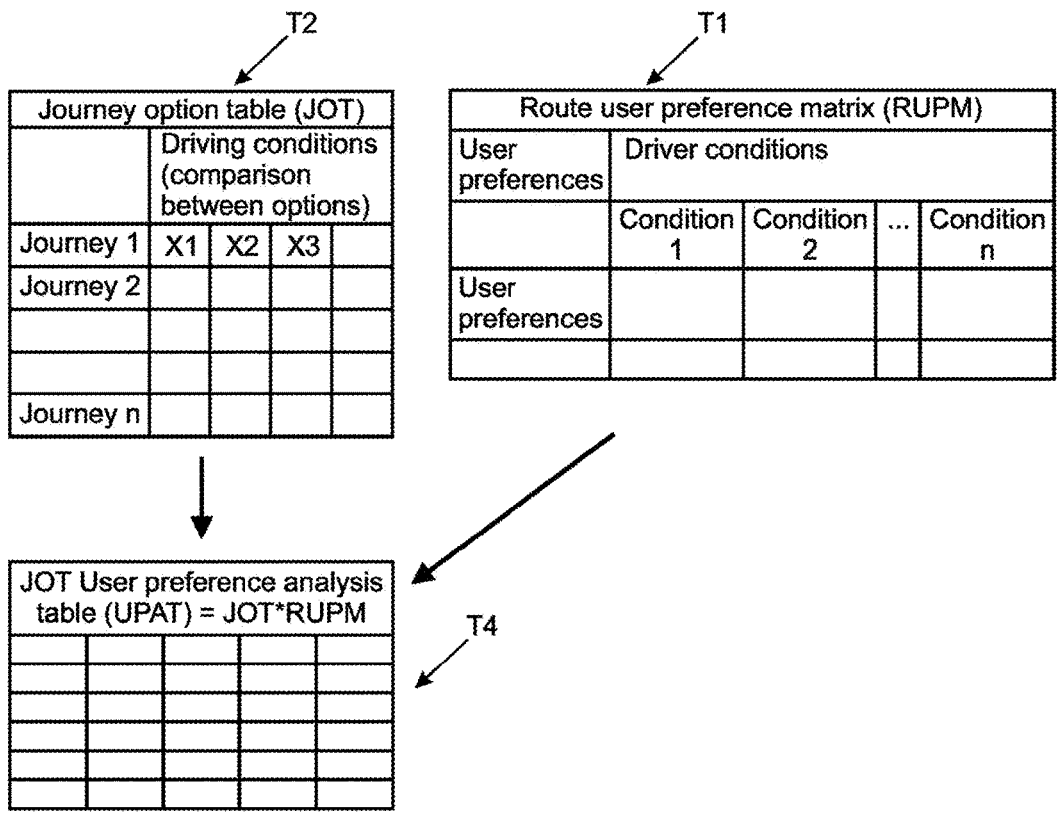
FIGS. 6A-6C together comprise FIG. 6 which illustrates a method of using the route planning device to manipulate data to generate an intermodal route in accordance with an embodiment of the present invention.
Figure 6A:
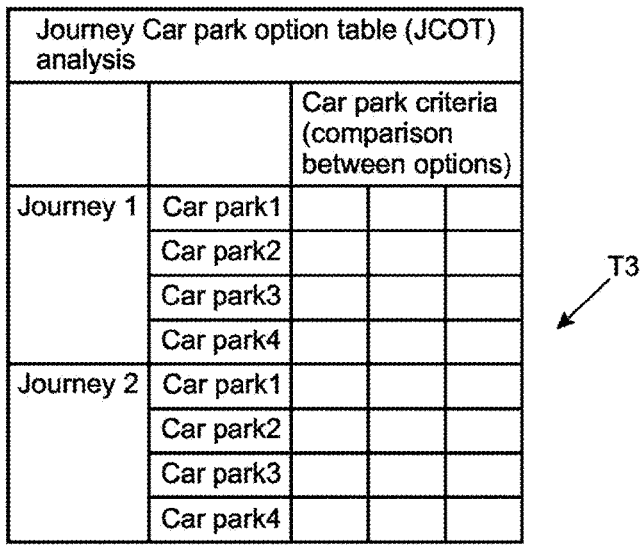
Figure 6B:
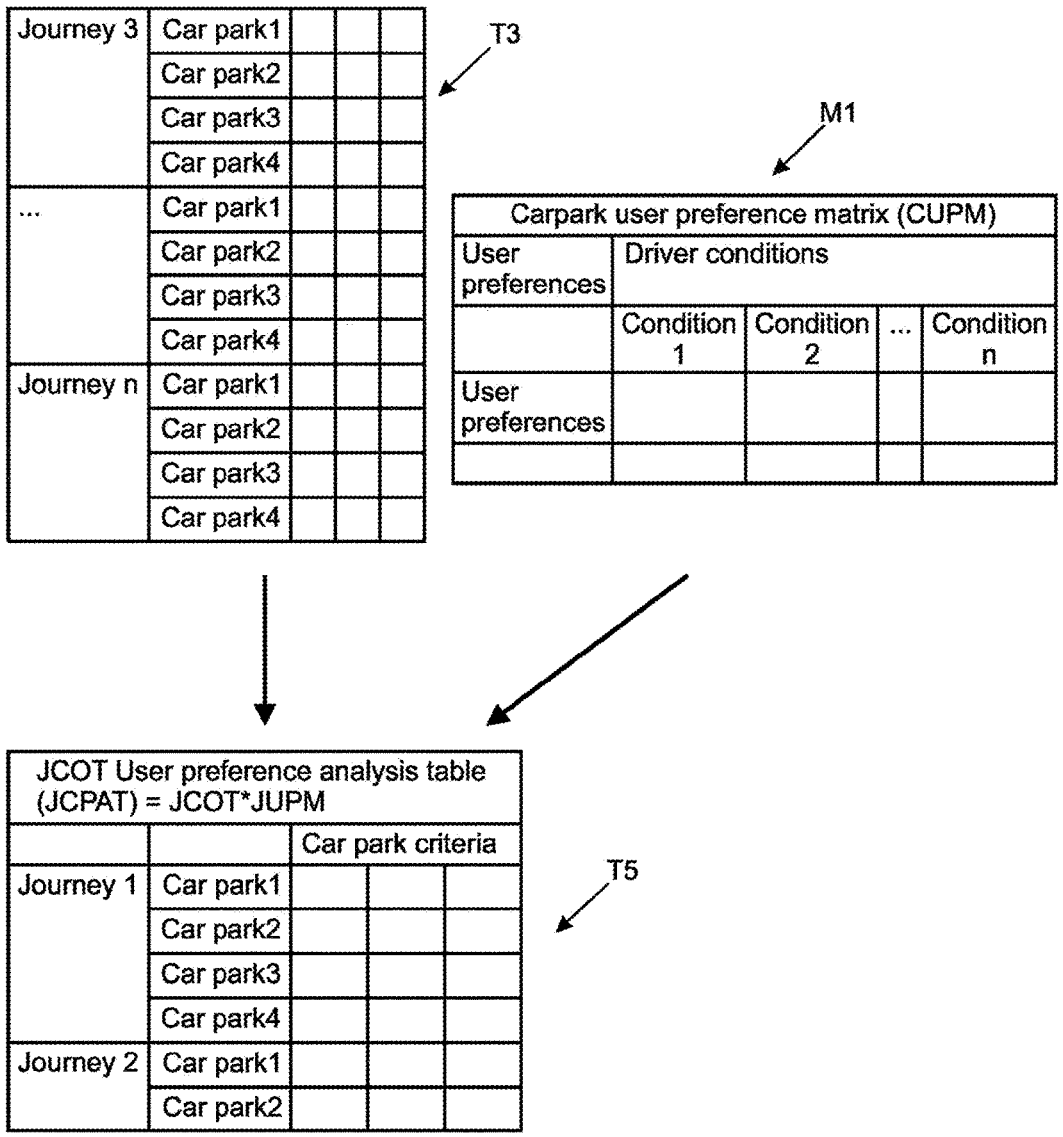
Figure 6C:

The second sub-routine 300 which identifies the public transport stations will now be described with reference to FIG. 4. A journey option table T2 is created by linking one or more public transport options to reach the specified destination (STEP 301). The route options are analyzed (STEP 302) against the user preferences using real-time and/or historic data. The timing for a return journey from the specified destination is identified or estimated (STEP 303) using historic data and/or live data from the user's calendar. A return journey (including options, time and cost) is analyzed (STEP 304) against the user behavior and preference table T1 and historic and/or current data. A prompt is issued (STEP 305) to check if any return journey options are missing from the displayed option table. If the user indicates that a return journey option is missing, this is added to the option table (STEP 306). Any options found for the return journey will automatically be added to the journey option table. The device 3 will highlight those options for the return journey which are limited or not available at an identified return journey time. Similarly, the device 3 will notify the user if it determines that there is no service currently available (or there is a delayed service) at one of said interchange options, but there are suitable travel options available for the return journey.

The information can be collected from an on-board database, for example stored on the memory device provided in the vehicle 1; or by accessing a remote database over a wireless network.

The third sub-routine 400, which is implemented to identify possible car park locations, will now be described with reference to FIG. 4. A parking option table T3 (shown in FIG. 6) is created for the journey (STEP 401) to identify all parking options available near the specified destination and at any journey break points along the one or more routes identified. Analysis of the parking options is performed (STEP 402) based on the estimated arrival time and the data stored in the preferences and behavior table T1 making use of the historic and current data. The user return journey timing is then identified or estimated using historic data and live data from the user's calendar (STEP 403). An analysis is made of parking conditions (including cost) for the time of the stay and the return journey time against the user preferences and behavior table T1 (STEP 404). A query is raised as to the possibility of a parking option being missing from the option table (STEP 405). If the device 3 receives confirmation that a car parking option is missing, a parking option is added to the journey car park option table T3 (STEP 406) and the earlier procedures in the third sub-routine 400 (STEPS 401 to 405) are repeated.

As shown schematically in FIG. 6, the journey option table T2 and the user behavior and preference table T1 are combined to generate a user preference analysis table T4. The user preference analysis table T4 provides a journey/route preference ranking. The available car parks for each journey are then identified to create the journey car park option table T3. The user behavior and preference table T1 contains a car park user preference matrix M1 which links the user preferences to a plurality of predefined conditions, such as driving conditions. The car park user preference matrix M1 is combined with the journey car park option table T3 to create a user preference analysis table T5. The user preference analysis table T5 defines each of the available journeys and identifies each car park associated therewith.

The device 3 can compare the routes and/or car park options against each other to give weightage in the journey option table T2 and the journey car park option table T3 (e.g. two journey options require three (3) changes, one journey option requires one (1) change, and the other journey option requires no (0) changes; the device 3 will mark the no change journey option to 3 points, the one change journey option to 2 points and the three change journey options will each be allocated to 1 point). The required number of options could vary depending on the route and it will be appreciated that a fixed number of weightage points will not provide accurate results.

The method described herein to determine the user preference analysis table T5 is provided by way of example only and is intended to outline a simple procedure for identifying the route and car park(s). This approach allows a user to choose from a variety of identified scenarios, including a non-preferred car park on a preferred route, a preferred car park on a non-preferred route, and a preferred car park on a preferred route.

Figure 7:
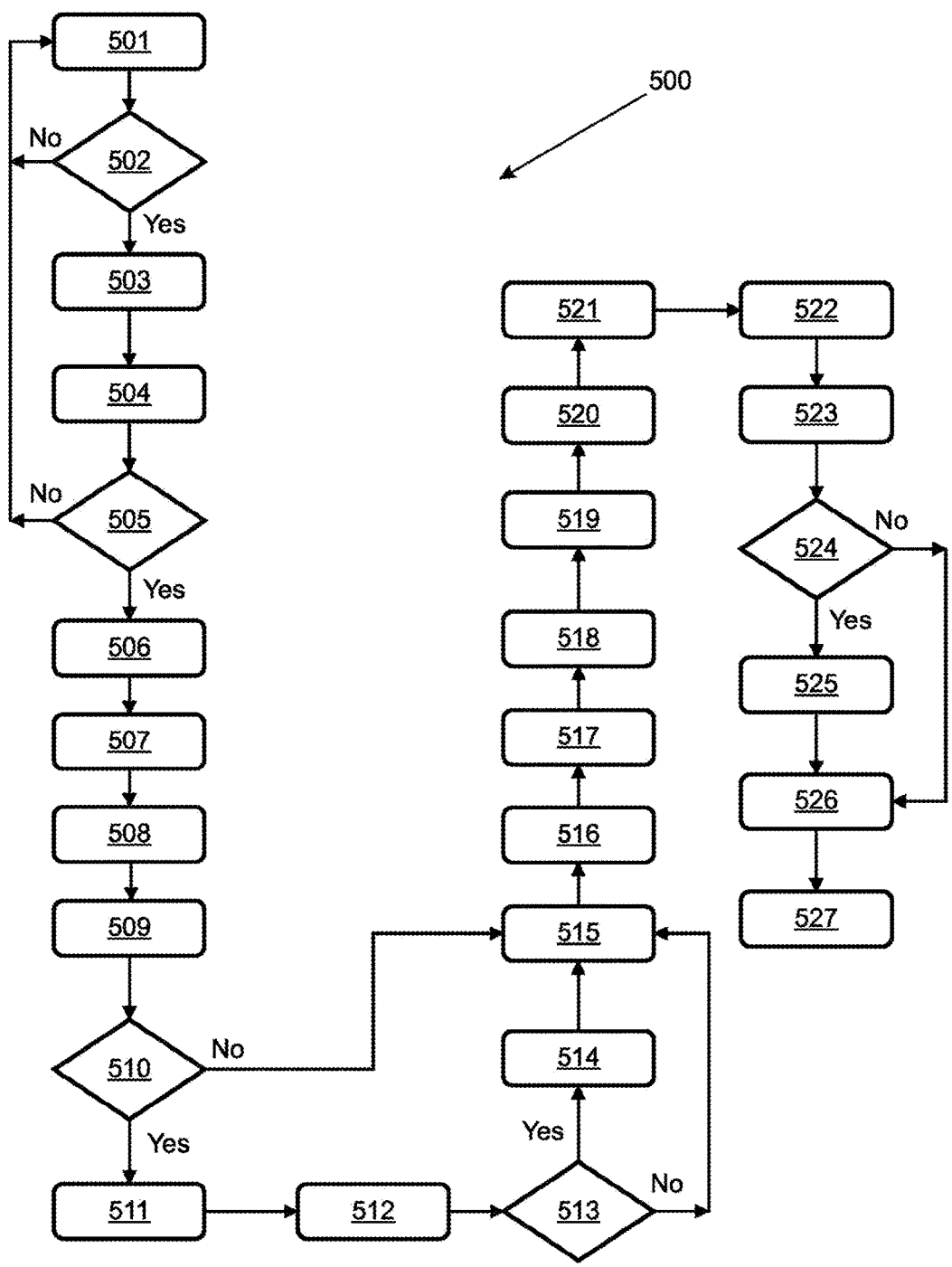
FIG. 7 shows a procedural flow chart for the interaction between the vehicle and a mobile receiving application in accordance with an embodiment of the present invention.

FIG. 7 shows an embodiment of an interaction (500) between the route planning device and a mobile device. Each of the steps in FIG. 7 has been identified below in the table.

| Step number | |
|---|---|
| 501 | Vehicle system activated |
| 502 | Detect event |
| 503 | Identify alternative intermodal journey option to the destination for a whole journey as disclosed in FIGS. 2 to 6 while ensuring some means of return journey transport is available |
| 504 | Inform driver about the incident and suggest intermodal journey option |
| 505 | User response |
| 506 | User reached breakpoint/car park for intermodal journey |
| 507 | Driver turns off vehicle |
| 508 | Vehicle system sends further/return journey options to the user through a mobile counterpart/ email/ text message |
| 509 | Receiving mobile application continuously monitors conditions on the route to update the driver |
| 510 | Detect event |
| 511 | Identify alternative intermodal journey option to the destination for the whole journey as disclosed in FIGS. 2 to 6 |
| 512 | Inform the user about the incident and suggest intermodal journey option |
| 513 | User response |
| 514 | Update journey options |
| 515 | User continues journey to the destination |
| 516 | User arrive at the destination |
| 517 | Mobile application identifies return journey time as setup by the vehicle system. |
| 518 | Mobile application checks update on the previous planned journey and updates on the route |
| 519 | Mobile application informs the user about the options |
| 520 | User starts return journey |
| 521 | Mobile application updates vehicle system about the return journey status |
| 522 | Identify alternative intermodal journey option to the destination for the whole journey as disclosed in other flow charts |
| 523 | Inform the driver about the incident and suggest intermodal journey option |
| 524 | User response |
| 525 | Update journey options and inform vehicle system |
| 526 | User continues journey to the destination |
| 527 | User arrives at the destination |

While a vehicle system is activated (STEP 501), an event is detected (STEP 502). The event may be a change in conditions in/around a destination (e.g. car park is full, there was an accident or a road closure etc.); a change in condition on the route (e.g. a congestion); and/or availability of public transport modes to reduce $CO_2$, time or cost. If the event is detected the system identifies an alternative intermodal journey option to the destination (Destination I) for a whole journey as described in other flow charts while ensuring some means of return journey transport is available (STEP 503). The return journey will be considered with view of cost and $CO_2$ saving to make a decision about breakpoint(s) for intermodal transport(s) along with user preferences. After the identification, a user (or a driver in this example) is informed about the incident and intermodal journey options are suggested (STEP 504). If the user does not respond then the system proceeds to the previous state and continues to monitor the situation or proceeds with a planned route that has been previously suggested and accepted. The planning of the route will go into default mode (go to STEP 501). If the user responds positively to the suggestion then the planned route, effectively the destination and/or intermediate location would be amended accordingly. Steps 501 to 505 are envisaged to be an iterative process with input from real-time events described above.

When the user follows the planned route and arrives at the breakpoint such as a car park for intermodal journey (STEP 506) the user turns off his vehicle (STEP 507). When the user triggers the sequence of switching off the vehicle, the vehicle or the route planning device installed in the vehicle sends further legs of the journey and return journey options to the user through a mobile counterpart (STEP 508). This can be through email, text message or using Bluetooth® connection directly to the counterpart mobile device through a receiving application. The mobile receiving app will continuously monitor conditions on the route to update the user (STEP 509). In this way information on the planned route can be maintained but also the route to the destination can be planned continuously in real-time even when the user is no longer driving. This also saves the user having to re-plan the journey from the point of change of the mode of travel.

As with the route planning device on board the vehicle the mobile receiving application will continue with the monitoring and if an event is detected (STEP 510) alternative intermodal journey options to the destination (Destination I) for the whole journey as described in other flow charts are identified (STEP 511). Similarly to the step 504 the user is informed about the incident and intermodal journey options are suggested (STEP 512). The user responses to the suggestion (STEP 513). If the user does not want to change his route the user will continue to follow the route to the destination (Destination I) (STEP 515). If the user does accept the suggestion then the journey options are updated to take new conditions into account (STEP 514).

After the user has arrived at his destination (Destination I) (STEP 516), the mobile application identifies a return journey time as setup by the vehicle system (STEP 517) and alert the user accordingly. For example, the application would alert the user when the user needs to start his journey back to where his vehicle is parked in order to arrive at the car park in time. The return journey time is estimated by the vehicle system from historic data and/or calendar entry as explained above. The calculation of the estimation has been done by the vehicle before the user leaves the vehicle. Therefore it does not require extra computational power from the mobile device. The whole journey which is planned whilst the user was in the vehicle at the start of the intermodal leg of the journey is transmitted to the mobile receiving application as an initial route option at the start of the journey. Thus as an option the user can refer to this default route.

The mobile application checks any update on the previously planned journey and updates the route accordingly (STEP 518). For example, the planned journey can be compared with real-time travel information and only when a difference between the two has been detected, the system recalculates its previous route plan. The user is informed of any potential options arising from the updates (STEP 519). The user then starts the return journey (STEP 520). The mobile application updates the vehicle system about the return journey status (STEP 521). The vehicle receiver can use this to pre-condition the vehicle around the estimated time or around the time any prepaid parking expires. Alternatively, the vehicle can be pre-conditioned depending on the estimated distance, or on the user's predefined conditions and preferences. For example, the vehicle can be pre-conditioned 15 minutes before the user arrives back at the vehicle.

In this embodiment, the mobile application identifies alternative intermodal journey option to the destination (Destination II) for a whole journey as described in the flow charts described above (STEP 522) and informs the user about the incident and suggest intermodal journey option (STEP 523). The user makes a decision whether to accept the new suggested option (STEP 524). If the user accepts the suggestion then the journey route is updated (STEP 525) then the user can continue on with the journey to the destination (Destination II) until the user reaches the destination (Destination II) (STEP 526, 527). If the user does not accept the suggested options the planned route is kept and the user can continue his journey to the destination using already set up route (STEP 526, 527).

It will be appreciated that various changes and modifications can be made to the device 3 described herein. Whereas in certain embodiments of invention the system resides in the vehicle, in other embodiments the system resides in a portable nomadic device which is therefore able to be removed from the vehicle. In yet other embodiments, the system resides in a remote server which is capable of communicating with the in-vehicle system. In all the embodiments, the system is capable of communicating with a personal mobile device.

The invention claimed is:

1. A route planning system for a multi vehicle mode return journey, the system comprising:
a route planning device; and
a dedicated software application operable on a user's personal mobile device,
wherein the route planning device is configured to transfer information to the dedicated software application, and further wherein the route planning device comprises an electronic processor and an electronic storage device having a computer program code stored therein, wherein the processor is configured to access the storage device and execute the code stored therein such that it is configured to:
identify a start location for a return journey;
identify a destination for the journey;
identify an intermediate location for a user to travel to in the vehicle and change to a different mode of transport;
identify at least one car park proximal to the identified intermediate location for parking the vehicle, and determine one or more of the following parameters relating to each car park:
availability of parking spaces for the vehicle;
a financial cost of parking the vehicle; and
opening hours of the car park;
generate a travel route from the start location to the destination and back;
cause the generated travel route to be presented to the user to enable the user to confirm acceptance of the generated travel route;
wherein generating the travel route comprises comparing a plurality of modes of transport and selecting at least one of said plurality of modes of transport in dependence on one or more preferences associated with a vehicle user, and also comprises generating the travel route in dependence on the identified at least one car park and at least one of the determined one or more parameters relating to each of said identified at least one car park;
the processor monitoring current data during the duration of the journey from a user leaving the start location until returning to the start location, and in response to changes in current data and in dependence on preferences based on historical data and current data, determining whether to propose a modification to the travel route and causing the proposed modification to be presented to the user by causing information concerning the proposed modification to be transferred to the dedicated software application on the user's personal mobile device to enable the user to confirm acceptance of the proposed modification.

2. A route planning system as claimed in claim 1, wherein said current data is obtained by accessing a remote server over a wireless network.

3. A route planning system as claimed in claim 1, wherein at least some of said preferences are pre-defined by said user.

4. A route planning system as claimed in claim 1, wherein said one or more preferences comprise one or more of the following:
a distance that the user prefers to walk;
a preferred mode of personal transport;
a preferred mode of public transport;
a scheduled appointment time;
an estimated time to destination;
an estimated return time;
carbon dioxide emissions; and
a scheduled connection.

5. A route planning system as claimed in claim 1, wherein the processor is configured to identify said intermediate location from one or more candidate locations in dependence on said one or more preferences associated with said user.

6. A route planning system as claimed in claim 5, wherein the intermediate location is based on real time information relating to each said candidate location.

7. A route planning system as claimed in claim 1, wherein the generated route comprises at least one car park for the vehicle.

8. A route planning system as claimed in claim 1, wherein the processor is configured to select one of a plurality of said car parks in dependence on said one or more preferences associated with said user.

9. A route planning system as claimed in claim 1, wherein the current vehicle location is determined by communication with a satellite network.

10. A method of generating a route for a multi vehicle mode return journey, the method comprising:
identifying a start location for a return journey;
identifying a destination for the journey;
identifying, by an electronic processor, an intermediate location for a user to travel to in the vehicle and change to a different mode of transport;
identifying, by the electronic processor, at least one car park proximal to the identified intermediate location for parking the vehicle, and determining, by the electronic processor, one or more of the following parameters relating to each car park:
availability of parking spaces for the vehicle;
a financial cost of parking the vehicle; and
opening hours of the car park;
generating, by the electronic processor, a travel route from the start location to the destination and back, and causing the generated travel route to be presented to the user to enable the user to confirm acceptance of the generated travel route;
wherein generating the travel route comprises comparing a plurality of modes of transport and selecting at least one of said plurality of modes of transport in dependence on one or more preferences associated with a vehicle user, and also comprises generating the travel route in dependence on the identified at least one car park and at least one of the determined one or more parameters relating to each of said identified at least one car park; and
monitoring, by the electronic processor, current data during the duration of the journey from a user leaving the start location until returning to the start location, and in response to changes in current data and in dependence on preferences based on historical data and current data, determining, by the electronic processor, whether to propose a modification to the travel route and causing, by the electronic processor, the proposed modification to be presented to the user by transferring information concerning the proposed modification from the electronic processor to a dedicated software application operable on a user's personal mobile device to enable the user to confirm acceptance of the proposed modification.

11. A route planning system according to claim 1, in which the dedicated software application transfers information to the processor when a return journey commences.

12. A route planning system according to claim 1 in which the route planning device resides in a vehicle.

13. A route planning system according to claim 12, in which the processor resides in a remote server which is capable of communication with the route planning device in a vehicle.

14. A route planning system according to claim 1, in which the route planning device resides in a portable nomadic device.

15. A vehicle comprising a route planning device for a multi vehicle mode return journey, the route planning device comprising an electronic processor and an electronic storage device having a computer program code stored therein, wherein the processor is configured to access the storage device and execute the code stored therein such that it is configured to:
identify a start location for a return journey;
identify a destination for the journey;
identify an intermediate location for a user to travel to in a vehicle and change to a different mode of transport; and
identify at least one car park proximal to the identified intermediate location for parking the vehicle, and determine one or more of the following parameters relating to each car park:
availability of parking spaces for the vehicle;
a financial cost of parking the vehicle; and
opening hours of the car park;
generate a travel route from the start location to the destination and back;
cause the generated travel route to be presented to the user to enable the user to confirm acceptance of the generated travel route;
wherein generating the travel route comprises comparing a plurality of modes of transport and selecting at least one of said plurality of modes of transport in dependence on one or more preferences associated with a vehicle user, and also comprises generating the travel route in dependence on the identified at least one car park and at least one of the determined one or more parameters relating to each of said identified at least one car park;
the processor monitoring current data during the duration of the journey from a user leaving the start location until returning to the start location, and in response to changes in current data and in dependence on preferences based on historical data and current data, determining whether to propose a modification to the travel route and causing the proposed modification to be presented to the user by causing the information concerning the proposed modification to be transferred to a dedicated software application operable on a user's personal mobile device to enable the user to confirm acceptance of the proposed modification.

* * * * *